United States Patent [19]

Lanphear

[11] 4,361,303

[45] Nov. 30, 1982

[54] CHAIN-LINK CONSTRUCTION FOR ELONGATED STRUCTURAL COMPONENTS

[76] Inventor: Marvin P. Lanphear, P.O. Box 725, Brush, Colo. 80723

[21] Appl. No.: 168,358

[22] Filed: Jul. 15, 1980

[51] Int. Cl.³ .............................................. F16M 11/20
[52] U.S. Cl. .................................. 248/188.1; D6/147; 59/80
[58] Field of Search ............................ 248/188.1, 158; 403/292; D6/147, 151; 46/25, 26; 59/80

[56] References Cited

U.S. PATENT DOCUMENTS

| D. 179,527 | 1/1957 | Rubin | D6/147 |
| D. 230,231 | 2/1974 | Merritt | D6/151 X |
| 3,566,531 | 3/1971 | Hasel et al. | 46/25 |
| 3,838,535 | 10/1974 | Larws | 46/25 |

FOREIGN PATENT DOCUMENTS

| 1491466 | 6/1966 | France | 46/25 |
| 1382134 | 1/1975 | United Kingdom | 46/25 |

Primary Examiner—J. Franklin Foss
Attorney, Agent, or Firm—Harvey B. Jacobson

[57] ABSTRACT

A structural column or beam having a straight geometrical axis is assembled from rigid, link-like sections. Each section has parallel spaced leg elements interconnected by spaced bridging elements intersected by the axis. The bridging elements also serve to interlock and rigidify the assembled link-like sections which are dimensioned for interchangeability and interfitting of cross connected columns and beams.

21 Claims, 21 Drawing Figures

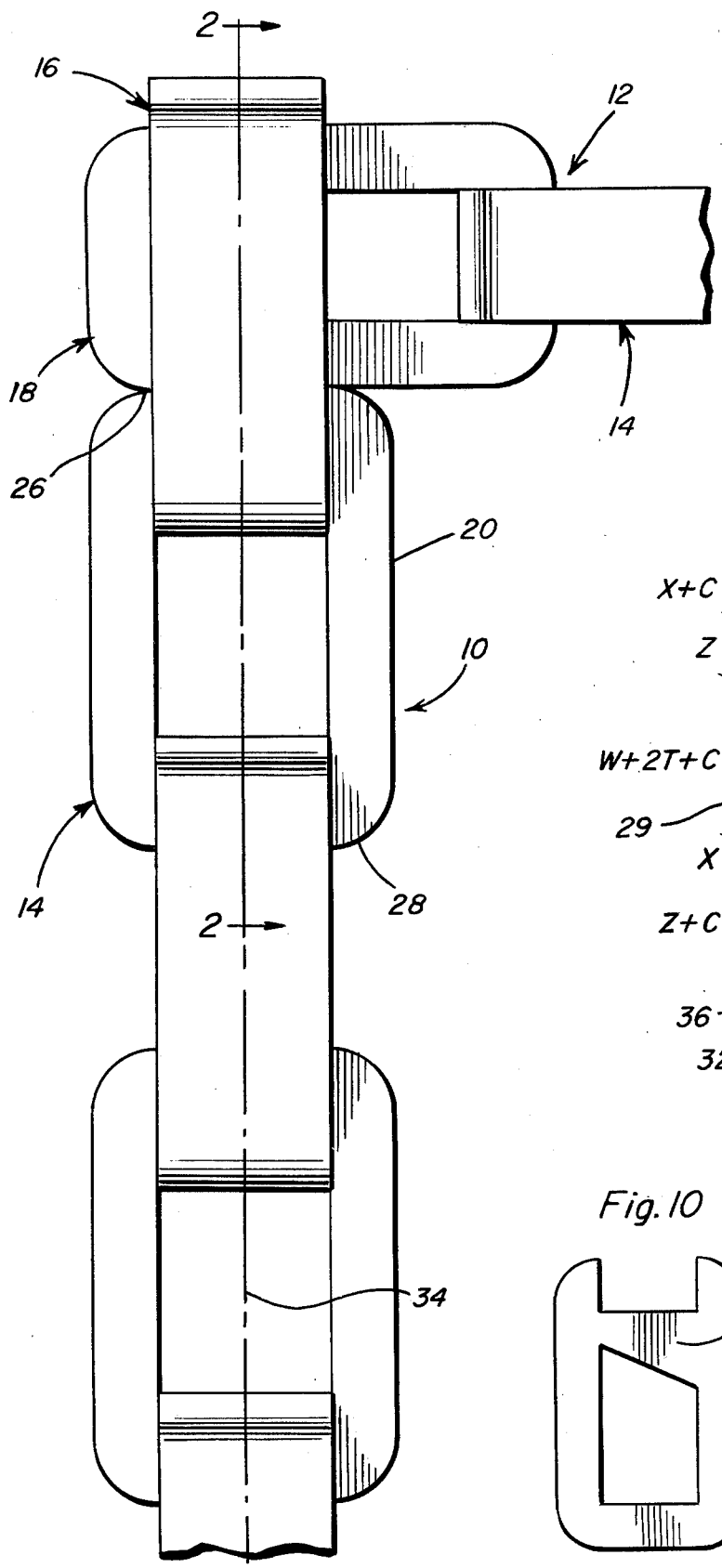
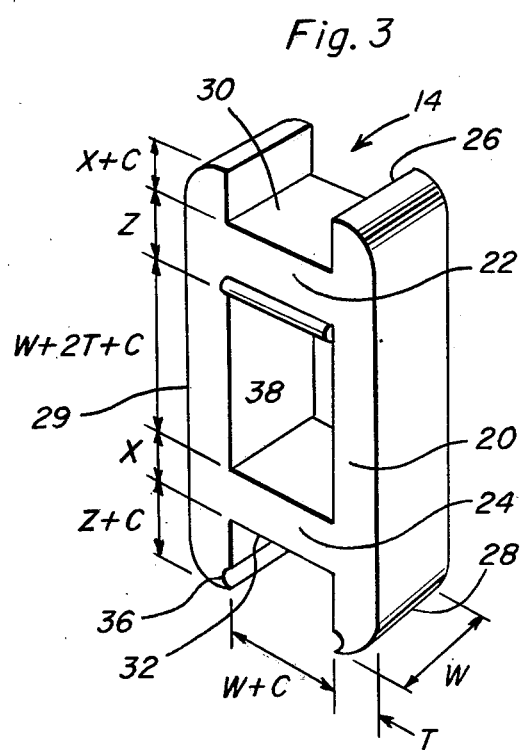
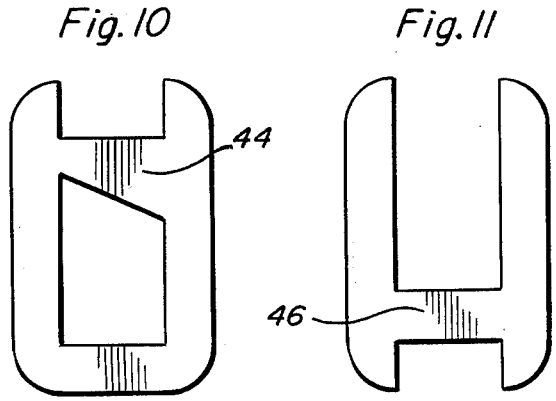

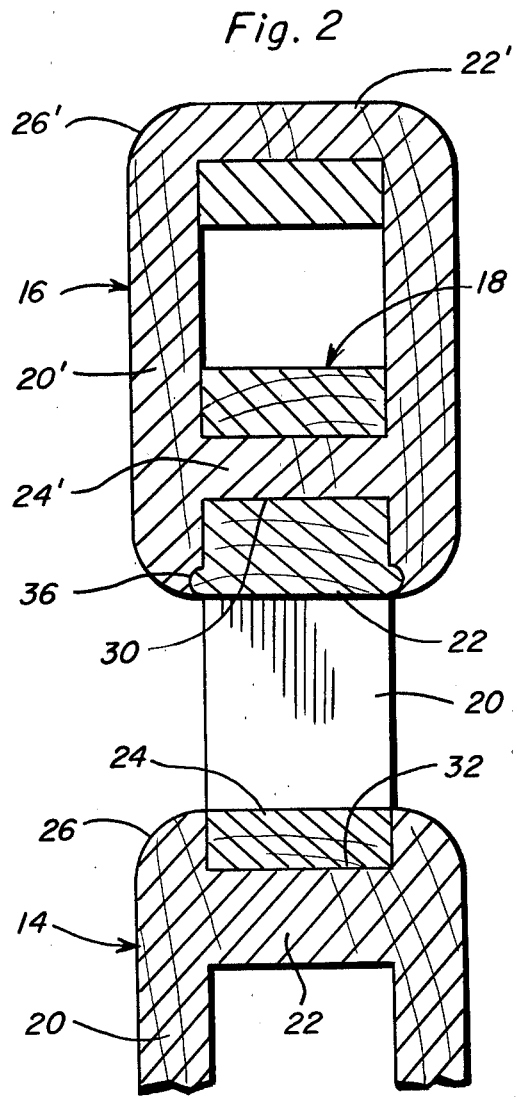
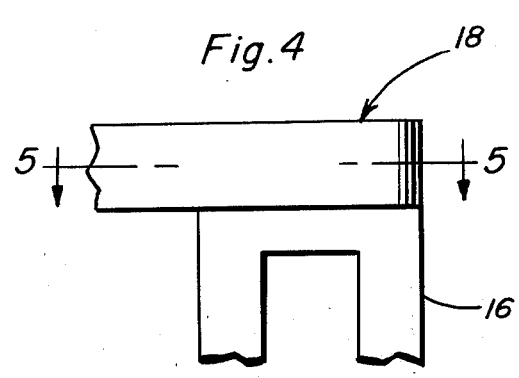
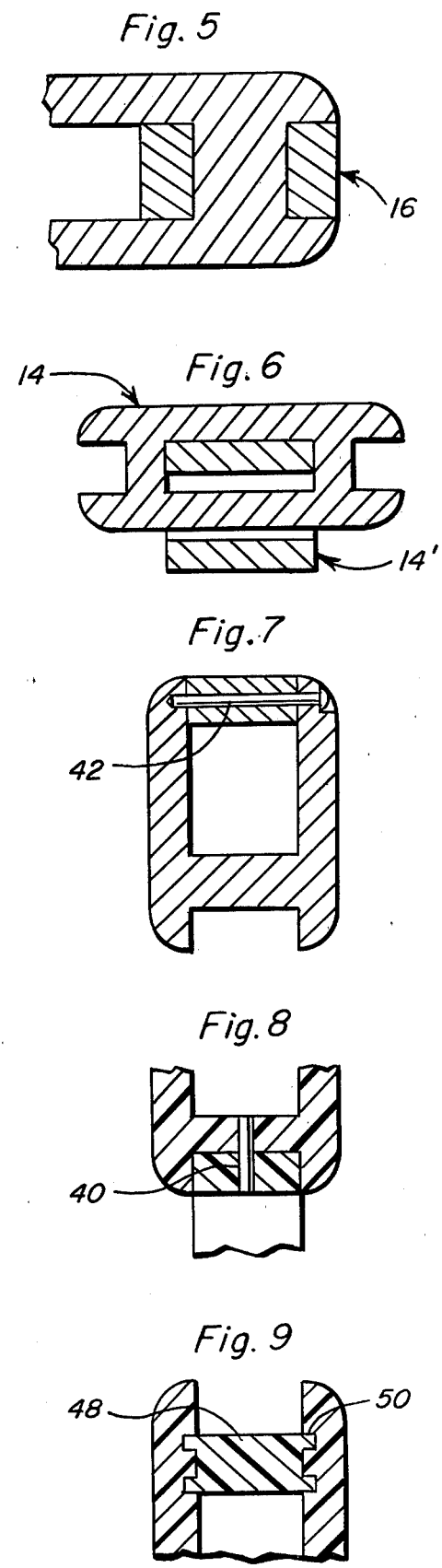

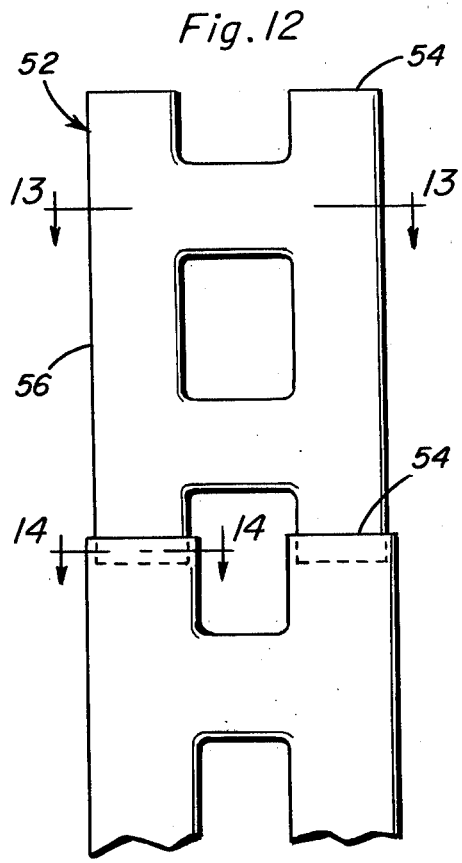
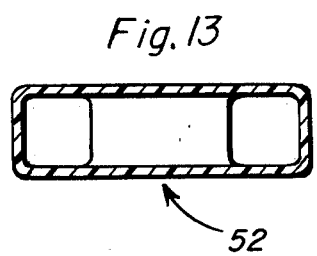
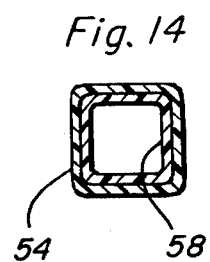
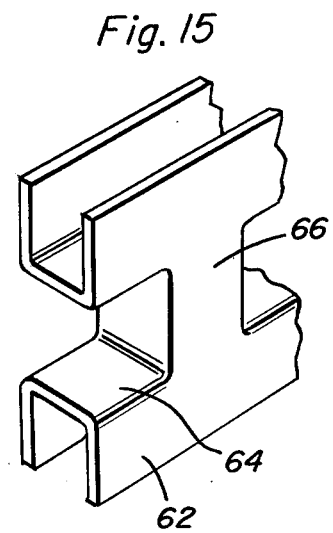
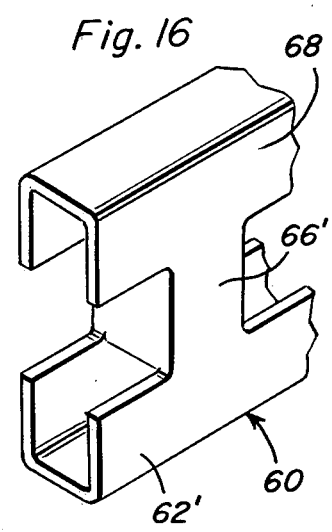
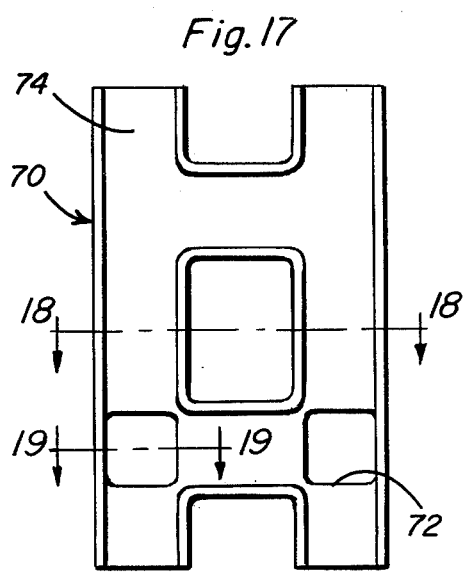
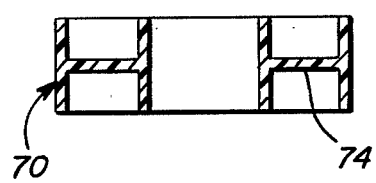
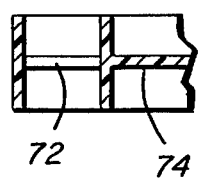
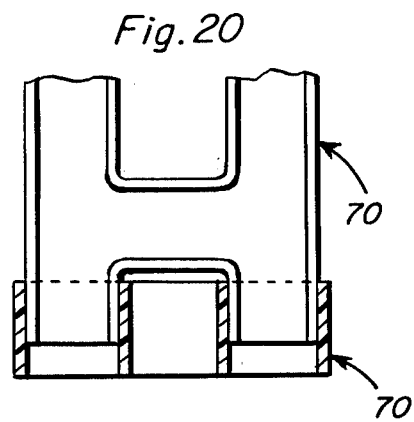
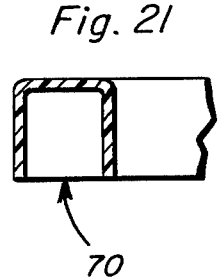

CHAIN-LINK CONSTRUCTION FOR ELONGATED STRUCTURAL COMPONENTS

BACKGROUND OF THE INVENTION

This invention relates to the construction of columns and beams for articles such as furniture and toys, and is an improvement over the constructions disclosed in my prior U.S. Pat. No. 4,135,689, issued Jan. 23, 1979, and in copending application Ser. No. 956,993, filed Oct. 31, 1978, now U.S. Pat. No. 4,228,979 issued Oct. 21, 1980 with respect to which the present application is a continuation-in-part.

According to my prior copending application and its parent copending application, now U.S. Pat. No. 4,135,689, cross connected column and beam constructions are disclosed in which each elongated structural component has a chain-like design wherein link sections are alternately aligned with perpendicular planes intersecting along a common straight axis. According to U.S. Pat. No. 4,135,689, aforementioned, each column or beam is made of a one-piece solid material. According to my prior copending application, the leg elements of each link section are separate pieces rigidly interconnected by a bridging element common to adjacent link sections in the column or beam. The manufacture and assembly of such columns and beams and their adaptation to different load supporting articles, has been somewhat costly.

It is therefore an important object of the present invention to provide a less costly and more versatile chain-link type of construction for structural columns and beams.

SUMMARY OF THE INVENTION

In accordance with the present invention, each column or beam is assembled from separate link-like sections to form a rigid chain-like assembly having a common geometrical axis with alternate links aligned with perpendicular planes intersecting on the axis. Each link-like section includes a pair of leg elements rigidly interconnected by at least one bridging element. The leg elements are spaced apart in the face plane of the section, parallel to the common axis, by an amount substantially equal to the maximum width of the link-like section transverse to the face plane so as to accommodate interfitting of adjacent link-like sections in overlapping relation to each other along the common axis. When interfitted, the bridging elements of adjacent sections spaced from the ends of the leg elements abut on flat surfaces intersected by the common axis to rigidify the chain-like assembly. Glue, fasteners, dowels or snap-in joints may be utilized to hold the abutment surfaces in engagement.

The link-like sections are dimensioned with respect to the thickness of the bridging elements, the overlap of the leg elements and the spacing between the bridging elements to accommodate interfit between adjacent sections in the column or beam and between intersecting sections of cross connected columns and beams. Further, the dimensions may be standardized for interchangeability of the sections and to enhance assembly of articles by consumers from disassembled sections in a kit or by order of sections from the stock inventory of a parts distributor.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF DRAWING FIGURES

FIG. 1 is a partial front elevational view of typical cross connected column and beam constructed in accordance with the present invention.

FIG. 2 is a partial section view taken substantially through a plane indicated by section line 2—2 in FIG. 1.

FIG. 3 is a perspective view of a standard link-like section associated with the column or beam shown in FIG. 1.

FIG. 4 is a partial front elevation view showing a cross connection between a column and beam different from that shown in FIG. 1.

FIG. 5 is a section view taken substantially through a plane indicated by section line 5—5 in FIG. 4.

FIG. 6 is a section view showing yet another type of cross connection.

FIG. 7 is a section view through an end link section different from those shown in FIGS. 1 and 2.

FIG. 8 is a partial section view showing the fastening of adjacent link-like sections in a manner different from that shown in FIG. 2.

FIG. 9 is a partial section view through a link-like section having a somewhat different construction than that shown in FIG. 2.

FIGS. 10 and 11 are front elevation views of different special types of link-like sections.

FIG. 12 is a front elevation view of stacked link-like sections made in accordance with another embodiment of the invention.

FIG. 13 is a section view taken substantially through a plane indicated by section line 13—13 in FIG. 12.

FIG. 14 is a section view taken substantially through a plane indicated by section line 14—14 in FIG. 12.

FIGS. 15 and 16 are partial perspective views showing other constructional embodiments of the link-like assembly sections.

FIG. 17 is a front elevation view of yet another link-like section constructed in accordance with the present invention.

FIG. 18 is a transverse section view taken substantially through a plane indicated by section line 18—18 in FIG. 17.

FIG. 19 is a partial section view taken substantially through a plane indicated by section line 19—19 in FIG. 17.

FIG. 20 is a section view similar to that of FIG. 19 showing the intersection of two link-like sections.

FIG. 21 is a partial section view showing still another embodiment of a link-like section.

DETAILED DESCRIPTION OF PREFERRED EMBODIMENTS

Referring now to the drawings in detail, FIG. 1 illustrates a portion of a structural article formed by cross connected vertical column 10 and horizontal beam 12. The article may be a piece of furniture such as a bed, chair, dresser, or any other article including toys. In the illustrated embodiment, both the column and beam are rigid elongated structural components of a chain-like design similar to that disclosed in my prior U.S. Pat. No. 4,135,689 aforementioned. Each column and beam is assembled from identical standard link-like sections 14, except for the end sections 16 and 18 respectively associated with the column 10 and beam 12.

FIG. 3 illustrates one of the standard link-like sections 14 that may be readily stocked. The section 14 includes a pair of leg elements 20 interconnected in parallel spaced relation to each other by a pair of parallel spaced bridging elements 22 and 24 disposed at right angles to the leg elements. The bridging elements are spaced from each other and from the adjacent longitudinal ends 26 and 28 of the leg elements in the face plane 29 of the section 14 as shown.

The dimensions of the section 14 are standardized to enable interchangeability and to accommodate assembly. Each of the leg elements 20 has a standard maximum thickness (T) in the face plane 29 while in a direction transverse to the face plane, the section has a maximum standard width (W). In the illustrated embodiment the width (W) is uniform throughout while the leg thickness (T) is also uniform except for the half rounding thereof at the ends 26 and 28. The bridging elements 22 and 24 also have a uniform thickness of (Z) and (X) as shown. The dimensions (Z) and (X) may be either equal or different as shown. The spacing between the bridging elements is substantially equal to the sum of the width (W) and the thickness of both leg elements (2T), except for a small clearance (C) to allow for easy assembly. The bridging element 22 is spaced from its adjacent ends 26 of the leg elements by an overlap distance (X+C) substantially equal to the thickness of the other bridging element 24 except for clearance (C). Similarly, the overlap distance (Z+C) spaces the bridging element 24 from its adjacent ends 28 of the leg elements. The spacing (W+C) between the leg elements is substantially equal to the width dimension (W) except for clearance (C).

Each of the bridging elements has a flat abutment surface 30 or 32 adapted to be abutted by surface 32 or 30 of an opposite bridging element associated with an adjacent link-like section assembled therewith as more clearly seen in FIG. 2. It will also be apparent from both FIGS. 1 and 2 that adjacent link-like sections overlap along a common geometrical axis 34 by the overlap distance (X+C) or (Z+C) spacing the abutting bridging elements 22 and 24 from the adjacent ends 26 or 28 of the leg elements. The flat abutting surfaces 30 and 32 of the bridging elements are intersected by the common axis 34 so as to maintain the assembly rigid with the briding element of one section interfitted between the leg elements of the adjacent section. The abutting surfaces 30 and 32 may be held in contact by various holding means including a snap-in joint formed by confronting parallel grooves 36 at the ends 28 of the leg elements receiving parallel projections 38 on the bridging element 22 as shown in FIGS. 2 and 3. The grooves 36 and projections 38 on each section 14 are elongated perpendicular to each other corresponding to the perpendicular alignment of alternate sections assembled into a column or beam.

Instead of a snap-in joint 36–38, the abutting bridging elements may be held together by glue or other adhesive or by a dowel pin 40 as shown in FIG. 8.

The end sections 16 and 18, as more clearly seen in FIG. 2, are the same as the other sections 14 except that one of the bridging elements 22' interconnects the leg elements 20' at the ends 26' without any overlap spacing. The spacing between bridging elements remains the same as in the sections 14 so as to receive the end section 18 of the cross connected beam 12. Cross connection of structural components may be effected in different ways shown in FIGS. 4, 5 and 6, wherein the sections of the two structural components are differently dimensioned.

Other special assembly sections may be provided as shown in FIGS. 7, 10 and 11. In FIG. 7, an end section is shown with a removable bridging element held assembled by an elongated fastener 42. In FIG. 10, an end section is shown having a bridging element 44 of non-uniform thickness. In FIG. 11, the link-like section has a single bridging element 46. Other special link-like sections may be made dimensionally longer than the standard sections for articles such as dresser drawers or wherever greater strength is required.

The link-like assembly sections herein described may be made of a solid one-piece material such as wood, either natural or laminated or of a synthetic plastic. Further, the bridging elements may be separately formed and permanently or non-permanently bonded to the leg elements. FIG. 9 show, for example, a bridging element 48 interfitted in proper position between the leg elements by notching 50. Thus, rigid sections may be assembled with differently dimensioned or shaped bridging elements to meet different requirements.

FIGS. 12 through 21 show link-like assembly sections that are particularly suited for manufacture by injection molding because of a thin wall construction. FIGS. 12 and 13, for example, show a tubular type of standard link-like section 52 having an outer shape and dimensions similar to that of sections 14 hereinbefore described, except for the ends of the leg elements. The ends 54 of the leg elements 56 are open and may receive opposite tapered ends 58 of another section 52 as shown so as to stack the sections in a non-chain like arrangement.

FIG. 15 shows another thin-wall construction type of standard section 60 wherein the leg elements 62 are channel-shaped, with the channel webs 64 being interconnected by channel-shaped bridging elements 66. In FIG. 16, a section 60' is shown wherein channel-shaped leg elements 62' having their flange portions 68 interconnected by the bridging elements 66'.

FIGS. 17, 18 and 19 show an I-beam type of thin-wall construction for standard sections 70. Openings 72 may be formed in the center web portion 74 of the section 70 as more clearly seen in FIGS. 17 and 19 so that the ends of the leg elements of another section may be inserted therethrough as shown in FIG. 20. FIG. 21 shows another channel shaped construction for a standard section 70', wherein the channel cross sections for the leg and bridging elements open on one side face of the section as compared to the channel opening on both faces of the section 70.

The thin wall types of link-like sections shown in FIGS. 12 through 21 may be manufactured most economically by use of injection molding techniques and will be especially suitable for educational building toys.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a rigid elongated structural component associated with a load supporting article including a plurality of longitudinally overlapping link-like sections alternately aligned with perpendicular planes intersecting along a common geometrical axis, wherein each of the link sections includes a pair of leg elements having opposite longitudinal ends and spaced bridging elements rigidly interconnecting the leg elements adjacent to said ends thereof, at least one of the bridging elements of each of the link-like sections abutting one of the bridging elements of an adjacent one of the link-like sections, each of said link-like sections having a maximum width (W) as measured along one of said perpendicular planes substantially equal to the spacing between the leg elements as measured in the other of said perpendicular planes, each of said leg elements having a thickness (T) transverse to the common axis as measured in said other of the perpendicular planes, the improvement residing in said bridging elements being spaced apart by a distance along the common axis substantially equal to said maximum width (W) and the thickness of both of the leg elements (2T).

2. The improvement as defined in claim 1 wherein the overlapping portions of the leg elements of the adjacent link sections are substantially equal in dimensions (X and Z) to the abutting bridging elements along the common axis.

3. The link-like section as defined in claim 1 wherein the overlapping portions at the opposite ends of the leg elements are dimensionally different.

4. The improvement as defined in claim 3 wherein each of the link-like sections is made of a unitary piece of solid material.

5. The improvement as defined in claim 4 wherein the load supporting article includes another elongated structural component extending transverse to the first mentioned structural component in intersecting relation to one of the link-like sections thereof.

6. The improvement as defined in claim 5 wherein said second mentioned elongated structural component is interfitted between the leg elements and the bridging elements of said intersected link-like section.

7. The improvement as defined in claim 1 wherein the load supporting article includes another elongated structural component extending transverse to the first mentioned structural component in intersecting relation to one of the link-like sections thereof.

8. The improvement as defined in claim 7 wherein said second mentioned elongated structural component is interfitted between the leg elements and the bridging elements of said intersected link-like section.

9. In a rigid elongated structural component associated with a load supporting article, including a plurality of longitudinally overlapping link-like sections alternately aligned with perpendicular planes intersecting along a common geometrical axis, each link section has a pair of leg elements with opposite longitudinal ends and at least one bridging element interconnecting the leg elements and spaced from an adjacent one of the longitudinal ends of the leg elements, the bridging elements of adjacent ones of the link-like sections abutting each other between longitudinally overlapping portions of the elements of the link-like sections, the improvement residing in said overlapping portions of the leg elements being substantially equal in dimensions longitudinally to the abutting bridging elements along the common axis.

10. The link-like section as defined in claim 9 wherein the overlapping portions at the opposite ends of the leg elements are dimensionally different.

11. The improvement as defined in claim 9 wherein said holding means comprises a snap-in joint between the overlapping portions of the leg elements and the bridging element of the adjacent link-like section interfitted between said overlapping portions.

12. The link-like section as defined in claim 9 including a second bridging element interconnecting the leg elements in parallel spaced relation to said one of the bridging elements, the spacing of said one of the bridging elements from the adjacent longitudinal ends of the leg elements being substantially equal to the maximum thickness of the second of the bridging elements in the one of the planes.

13. The assembly section as defined in claim 9 wherein the spacing between the bridging elements is substantially equal to the sum of said maximum width and the maximum thickness of both of the leg elements.

14. The assembly section as defined in claim 13 wherein the bridging elements have different maximum thicknesses.

15. The assembly section as defined in claim 14 wherein at least said one of the bridging elements has a flat abutment surface intersected by the axis, and holding means on said one of the bridging elements.

16. The assembly section as defined in claim 15, including additional holding means disposed on the leg elements adjacent to the second of the bridging elements and at right angles to the first mentioned holding means.

17. The assembly section as defined in claim 1 wherein one of the bridging elements has a flat abutment surface intersected by the common axis, and said holding means being on said one of the bridging elements.

18. The assembly section as defined in claim 17 including additional holding means disposed on the leg elements adjacent to the other of the bridging elements and at right angles to the first mentioned holding means.

19. The assembly section as defined in claim 9 wherein the spacing between the bridging elements is substantially equal to the sum of said maximum width and the maximum thickness of both of the leg elements.

20. The assembly section as defined in claim 19 wherein the bridging elements have different maximum thicknesses in one of the planes.

21. The improvement as defined in claim 9 including means on at least one of the abutting bridging elements for holding the adjacent sections rigidly assembled in interfitting relation between said overlapping portions of the leg elements.

* * * * *